US012705775B2

(12) United States Patent
Chen et al.

(10) Patent No.: US 12,705,775 B2
(45) Date of Patent: Aug. 11, 2026

(54) METHOD AND APPARATUS FOR OBTAINING 3D INFORMATION OF VEHICLE

(71) Applicant: Yinwang Intelligent Technologies Co., Ltd., Shenzhen (CN)

(72) Inventors: Yiqiang Chen, Shenzhen (CN); Jie Zhu, Shenzhen (CN); Lijun Xue, Shenzhen (CN)

(73) Assignee: Yinwang Intelligent Technologies Co., Ltd., Shenzhen (CN)

(*) Notice: Subject to any disclaimer, the term of this patent is extended or adjusted under 35 U.S.C. 154(b) by 438 days.

(21) Appl. No.: 17/902,561

(22) Filed: Sep. 2, 2022

(65) Prior Publication Data

US 2022/0414917 A1 Dec. 29, 2022

Related U.S. Application Data

(63) Continuation of application No. PCT/CN2021/076863, filed on Feb. 19, 2021.

(30) Foreign Application Priority Data

Mar. 6, 2020 (CN) ........................ 202010152507.4

(51) Int. Cl.

| | |
|---|---|
| ***G06T 7/70*** | (2017.01) |
| ***G06T 17/00*** | (2006.01) |
| ***G06V 10/24*** | (2022.01) |
| ***H04W 4/40*** | (2018.01) |

(52) U.S. Cl.

CPC ................ *G06T 7/70* (2017.01); *G06T 17/00* (2013.01); *G06V 10/24* (2022.01); *G06T 2207/30252* (2013.01); *G06T 2210/12* (2013.01); *H04W 4/40* (2018.02)

(58) Field of Classification Search

None

See application file for complete search history.

(56) References Cited

U.S. PATENT DOCUMENTS

| | | | | |
|---|---|---|---|---|
| 9,533,575 | B2 | 1/2017 | Tran et al. | |
| 11,024,045 | B2 * | 6/2021 | Wang | G06T 7/70 |

FOREIGN PATENT DOCUMENTS

| | | | |
|---|---|---|---|
| CN | 102930242 | A | 2/2013 |
| CN | 107093210 | A | 8/2017 |
| CN | 109242903 | A | 1/2019 |
| CN | 109631896 | A | 4/2019 |
| CN | 110414355 | A | 11/2019 |

(Continued)

OTHER PUBLICATIONS

Bazan et al., "A new method to estimate dimensions of vehicle using a single camera," Archives of Transport System Telematics, vol. 10, Issue 3, Sep. 2017, available at: https://bibliotekanauki.pl/articles/393575.pdf (last accessed Sep. 29, 2025) (Year: 2017).*

(Continued)

*Primary Examiner* — Michelle M Koeth

(74) *Attorney, Agent, or Firm* — Fish & Richardson P.C.

(57) ABSTRACT

A method and an apparatus for obtaining 3D information of a vehicle are provided. The method includes: first determining a body boundary line of a first vehicle, and then determining an observation angle and/or an orientation angle of the first vehicle based on the body boundary line.

12 Claims, 6 Drawing Sheets

(56) References Cited

FOREIGN PATENT DOCUMENTS

| | | | |
|---|---|---|---|
| CN | 110427797 | A | 11/2019 |
| CN | 110517349 | A | 11/2019 |
| CN | 111081033 | A | 4/2020 |
| DE | 102019002269 | A1 | 2/2020 |
| EP | 3621036 | A1 | 3/2020 |
| JP | 2001128158 | A | 5/2001 |

OTHER PUBLICATIONS

Fang et al., "3D Bounding Box Estimation for Autonomous Vehicles by Cascaded Geometric Constraints and Depurated 2D Detections Using 3D Results," arXiv: 1909.01867v1 [cs.CV], Sep. 1, 2019, https://doi.org/10.48550/arXiv.1909.01867 (Year: 2019).*

Schoepflin et al., "Dynamic camera calibration of roadside traffic management cameras for vehicle speed estimation," in IEEE Transactions on Intelligent Transportation Systems, vol. 4, No. 2, pp. 90-98, Jun. 2003, doi: 10.1109/TITS.2003.821213 (Year: 2003).*

Extended European Search Report in European Appln No. 21765079.5, dated Jun. 28, 2023, 9 pages.

Mousavian et al., "3D Bounding Box Estimation Using Deep Learning and Geometry," Submitted on Apr. 10, 2017, arXiv:1612.00496v2 [cs.CV] , 10 pages.

Qi et al., "PointNet: Deep Learning on Point Sets for 3D Classification and Segmentation," Submitted on Apr. 10, 2017, arXiv:1612.00593v2 [cs.CV], 19 pages.

Zhou et al., "VoxelNet: End-to-End Learning for Point Cloud Based 3D Object Detection," 2018 IEEE/CVF Conference on Computer Vision and Pattern Recognition, Jun. 18-23, 2018, 10 pages.

International Search Report and Written Opinion in International Appln. No. PCT/CN2021/076863, mailed on May 17, 2021, 18 pages (with English translation).

* cited by examiner

METHOD AND APPARATUS FOR OBTAINING 3D INFORMATION OF VEHICLE

CROSS-REFERENCE TO RELATED APPLICATIONS

This application continuation of International Application No. PCT/CN2021/076863, filed on Feb. 19, 2021, which claims priority to Chinese Patent Application No. 202010152507.4, filed on Mar. 6, 2020. The disclosures of the aforementioned applications are hereby incorporated by reference in their entireties.

TECHNICAL FIELD

This application relates to the field of automated driving object detection, and more specifically, to a method and an apparatus for obtaining 3D information of a vehicle.

BACKGROUND

With application of a neural network to an object detection task, two dimensional (two dimensional, 2D) object detection has reached a very good detection level. However, in a specific application scenario such as self-driving, robots, or augmented reality, not all information required in an actual application scenario can be output through common 2D object detection, and only a 2D position corresponding to a target object in a picture and confidence at which the target object belongs to different categories can be output through 2D object detection. In three dimensional (three dimensional, 3D) world perception, all objects are three dimensional, and information such as a length, a width, a height, a distance, an orientation angle, and an observation angle of a target object is required in most application scenarios.

In an automated driving scenario, information such as a three-dimensional size and an orientation angle of a target object needs to be obtained from an image. Projections of the information in a top view play a vital role in subsequent path planning and vehicle control in the automated driving scenario. Therefore, 3D target information prediction has a very important application in the automated driving field.

Existing 3D target information prediction mainly depends on sensors such as a monocular camera, a binocular camera, and a multi-wire laser radar. For example, 3D target information prediction is performed based on a laser, or 3D target information prediction is performed based on monocular vision and a neural network. The 3D target information prediction performed based on the laser is costly and has complex operations. Both data obtaining and a use operation of the 3D target information prediction performed based on the monocular vision and the neural network are inconvenient. Therefore, how to improve obtaining accuracy of 3D information of a vehicle on a premise of controlling costs becomes a problem to be urgently resolved.

SUMMARY

This application provides a method and an apparatus for obtaining 3D information of a vehicle, applied to the field of automated driving object detection, to improve obtaining accuracy of 3D information of a vehicle on a premise of controlling costs.

According to a first aspect, a method for obtaining 3D information of a vehicle is provided. The method for obtaining 3D information of a vehicle may be performed by a terminal device, or may be performed by a chip or a circuit disposed in the terminal device. This is not limited in this application.

The terminal device may be a mobile terminal device near a first vehicle, for example, a second vehicle, or a terminal device held by a pedestrian, "Near the first vehicle" may indicate an orientation in which the first vehicle can be detected, for example, in front of, behind, or on a side of the first vehicle.

The method for obtaining 3D information of a vehicle includes:

obtaining a body boundary line of the first vehicle, where the body boundary line includes a boundary line at a boundary between a body and a head of the first vehicle, or a boundary line at a boundary between the body and a tail of the first vehicle; and determining an observation angle of the first vehicle and/or an orientation angle of the first vehicle based on the body boundary line.

According to the method for obtaining 3D information of a vehicle provided in this application, the body boundary line of the first vehicle is first obtained; and then the observation angle of the first vehicle is determined based on a relationship between the body boundary line of the first vehicle and the observation angle of the first vehicle, and/or the orientation angle of the first vehicle is determined based on a relationship between the body boundary line of the first vehicle and the orientation angle of the first vehicle. The body boundary line of the first vehicle is obtained more easily than the observation angle and the orientation angle of the first vehicle, so that obtaining difficulty of the observation angle and/or the orientation angle is reduced, thereby improving obtaining accuracy of 3D information of the vehicle.

It should be noted that in this embodiment of this application, because there is a correspondence between the body boundary line of the first vehicle and the orientation angle of the first vehicle, and there is also a correspondence between the body boundary line of the first vehicle and the observation angle of the first vehicle, alternatively, the orientation angle of the first vehicle and/or the observation angle of the first vehicle may be first obtained; and then the body boundary line of the first vehicle may be determined based on the orientation angle of the first vehicle, or the body boundary line of the first vehicle may be determined based on the observation angle of the first vehicle. That is, the body boundary line of the first vehicle can be determined by predicting only one quantity of the orientation angle of the first vehicle and the observation angle of the first vehicle, so that a quantity of predicted quantities is reduced.

In addition, the observation angle of the first vehicle may be determined based on the body boundary line of the first vehicle in a calculation manner or a table lookup manner. A specific determining manner is not limited in this embodiment of this application.

For example, determining the observation angle of the first vehicle in the calculation manner includes: inputting a value of the body boundary line of the first vehicle based on a calculation formula met between the body boundary line of the first vehicle and the observation angle of the first vehicle, to obtain a value of the observation angle of the first vehicle through calculation.

For another example, determining the observation angle of the first vehicle in the table lookup manner includes: establishing a query table based on the correspondence met between the body boundary line of the first vehicle and the observation angle of the first vehicle, obtaining a value of the body boundary line of the first vehicle, and querying a value of the observation angle of the first vehicle from the query table.

Likewise, the orientation angle of the first vehicle may be determined based on the body boundary line of the first vehicle in a calculation manner or a table lookup manner. Details are not described herein.

With reference to the first aspect, in some implementations of the first aspect, the determining an observation angle of the first vehicle based on the body boundary line includes: first determining, based on the body boundary line and a width of a preset 2D bounding box, a projection of a body length of the first vehicle or a projection of a body width of the first vehicle in a direction parallel to an image plane; and then determining the observation angle of the first vehicle based on the projection of the body length of the first vehicle or the projection of the body width of the first vehicle in the direction parallel to the image plane, the width of the preset 2D bounding box, and a preset length-to-width ratio of the first vehicle.

For example, the determining an observation angle of the first vehicle based on the body boundary line of the first vehicle may be first determining, based on the body boundary line of the first vehicle, the projection of the body length of the first vehicle and/or the projection of the body width of the first vehicle in the direction parallel to the image plane; and then jointly determining the observation angle of the first vehicle based on the projection of the body length of the first vehicle and/or the projection of the body width of the first vehicle in the direction parallel to the image plane, the width of the preset 2D bounding box, and the preset length-to-width ratio of the first vehicle. For the width of the preset 2D bounding box, it may be understood that the width of the 2D bounding box is known, and for the preset length-to-width ratio of the first vehicle, it may be understood that the length-to-width ratio of the first vehicle is known. That is, the observation angle of the first vehicle can be determined based on the projection of the body length of the first vehicle and/or the projection of the body width of the first vehicle in the direction parallel to the image plane that are/is determined based on the obtained body boundary line of the first vehicle, and the known parameter values. This provides a specific manner of determining the observation angle of the first vehicle based on the body boundary line of the first vehicle.

It should be noted that in this embodiment of this application, the determining, based on the body boundary line of the first vehicle, the projection of the body length of the first vehicle or the projection of the body width of the first vehicle in the direction parallel to the image plane includes: obtaining a position (for example, coordinates) of the body boundary line of the first vehicle in a top view of an image corresponding to the first vehicle; determining, based on the known width of the preset 2D hounding box (for example, positions of two edges of the 2D bounding box in the top view of the image corresponding to the first vehicle) and a position relationship between the body of the first vehicle and the 2D bounding box of the image corresponding to the first vehicle, the projection of the body length of the first vehicle or the projection of the body width of the first vehicle in the direction parallel to the image plane. This is to be described in detail in the embodiments with reference to the accompanying drawings, and details are not described herein.

With reference to the first aspect, in some implementations of the first aspect, the projection of the body width of the first vehicle in the direction parallel to the image plane, the width of the preset 2D hounding box, and the preset length-to-width ratio of the first vehicle meet $$\theta = \arctan\left(\frac{\omega - a'}{\mu a'}\right)$$

with the observation angle of the first vehicle, where ω is the width of the preset 2D bounding box, μ is the preset length-to-width ratio of the first vehicle, a' is the projection of the body width of the first vehicle in the direction parallel to the image plane, and θ is the observation angle.

According to the method fir obtaining 3D information of a vehicle provided in this application, a relationship met between the projection of the body width of the first vehicle in the direction parallel to the image plane and the observation angle of the first vehicle may be represented by a relationship formula $$\theta = \arctan\left(\frac{\omega - a'}{\mu a'}\right).$$

In the relationship formula, an independent variable is the projection of the body width of the first vehicle in the direction parallel to the image plane, a dependent variable is the observation angle of the first vehicle, and the other parameters are known values. In addition, the projection of the body width of the first vehicle in the direction parallel to the image plane is determined based on the body boundary line of the first vehicle. It is equivalent that a form of a specific relationship formula met between the body boundary line of the first vehicle and the observation angle of the first vehicle is provided.

It should be noted that the relationship formula $$\theta = \arctan\left(\frac{\omega - a'}{\mu a'}\right)$$

is merely an example, and constitutes no limitation on the protection scope of this application. A simple transformation of the relationship formula also falls within the protection scope of this application.

With reference to the first aspect, in some implementations of the first aspect, the projection of the body length of the first vehicle in the direction parallel to the image plane, the width of the preset 2D bounding box, and the preset length-to-width ratio of the first vehicle meet $$\theta = \arctan\left(\frac{b}{\mu(\omega - b)}\right)$$

with the observation angle of the first vehicle, where ω is the width of the preset 2D bounding box, μ is the preset length-to-width ratio of the first vehicle, b is the projection of the body length of the first vehicle in the direction parallel to the image plane, and θ is the observation angle.

According to the method for obtaining 3D information of a vehicle provided in this application, a relationship met between the projection of the body length of the first vehicle in the direction parallel to the image plane and the observation angle of the first vehicle may be represented by a relationship formula $$\theta = \arctan\left(\frac{b}{\mu(\omega - b)}\right).$$

In the relationship formula, an independent variable is the projection of the body length of the first vehicle in the direction parallel to the image plane, a dependent variable is the observation angle of the first vehicle, and the other parameters are known values. In addition, the projection of the body length of the first vehicle in the direction parallel to the image plane is determined based on the body boundary line of the first vehicle. It is equivalent that a form of a specific relationship formula, met between the body boundary line of the first vehicle and the observation angle of the first vehicle is provided.

It should be noted that the relationship formula $$\theta = \arctan\left(\frac{b}{\mu(\omega - b)}\right)$$

is merely an example, and constitutes no limitation on the protection scope of this application. A simple transformation of the relationship formula also falls within the protection scope of this application.

With reference to the first aspect, in some implementations of the first aspect, the determining an orientation angle of the first vehicle based on the body boundary line includes: first determining, based on the body boundary line and the width of the preset 2D bounding box, the projection of the body length of the first vehicle in the direction parallel to the image plane, and determining, based on the body boundary line and the width of the preset 2D bounding box, the projection of the body width of the first vehicle in the direction parallel to the image plane; and then determining the orientation angle of the first vehicle based on the projection of the body length of the first vehicle in the direction parallel to the image plane, the projection of the body width of the first vehicle in the direction parallel to the image plane, respective angles between the two edges of the preset 2D bounding box and an optical center, and the preset length-to-width ratio of the first vehicle.

For example, the determining an orientation angle of the first vehicle based on the body boundary line of the first vehicle may be first determining, based on the body boundary line of the first vehicle, the projection of the body length of the first vehicle in the direction parallel to the image plane, and determining, based on the body boundary line and the width of the preset 2D bounding box, the projection of the body width of the first vehicle in the direction parallel to the image plane; and then jointly determining the orientation angle of the first vehicle based on the determined projection of the body length of the first vehicle in the direction parallel to the image plane, the determined projection of the body width of the first vehicle in the direction parallel to the image plane, the respective angles between the two edges of the preset 2D bounding box and the optical center, and the preset length-to-width ratio of the first vehicle. For the width of the preset 2D bounding box, it may be understood that the width of the 2D bounding box is known, for the preset length-to-width ratio of the first vehicle, it may be understood that the length-to-width ratio of the first vehicle is known, the projection of the body length of the first vehicle in the direction parallel to the image plane is known, and the respective angles between the two edges of the preset 2D bounding box and the optical center are also known. That is, the orientation angle of the first vehicle can be determined based on the projection of the body length of the first vehicle in the direction parallel to the image plane and the projection of the body width of the first vehicle in the direction parallel to the image plane that are determined based on the obtained body boundary line of the first vehicle, and the known parameter values. This provides a specific manner of determining the orientation angle of the first vehicle based on the body boundary line of the first vehicle.

With reference to the first aspect, in some implementations of the first aspect, the projection of the body width of the first vehicle in the direction parallel to the image plane, the projection of the body length of the first vehicle in the direction parallel to the image plane, the respective angles between the two edges of the preset 2D bounding box and an optical center direction, and the preset length-to-width ratio of the first vehicle meet $$\varphi = \arctan\left(\frac{\mu b1 - a\tan\beta}{a + \mu b1\tan\alpha}\right)$$

with the orientation angle of the first vehicle, where a is the projection of the body length of the first vehicle in the direction parallel to the image plane, b1 is the projection of the body width of the first vehicle in the direction parallel to the image plane, α is an angle between a left edge of the 2D bounding box and the optical center direction, β is an angle between a right edge of the 2D bounding box and the optical center direction, and φ is the orientation angle of the first vehicle.

According to the method for obtaining 3D information of a vehicle provided in this application, a relationship met between the projection of the body width of the first vehicle in the direction parallel to the image plane, the projection of the body length of the first vehicle in the direction parallel to the image plane, and the orientation angle of the first vehicle may be represented by a relationship formula $$\varphi = \arctan\left(\frac{\mu b1 - a\tan\beta}{a + \mu b1\tan\alpha}\right).$$

In the relationship formula, independent variables are the projection of the body width of the first vehicle in the direction parallel to the image plane and the projection of the body length of the first vehicle in the direction parallel to the image plane, a dependence variable is the orientation angle of the first vehicle, and the other parameters are known values. In addition, the projection of the body length of the first vehicle in the direction parallel to the image plane and the projection of the body width of the first vehicle in the direction parallel to the image plane are determined based on the body boundary line of the first vehicle. It is equivalent that a form of a specific relationship formula met between the body boundary line of the first vehicle and the orientation angle of the first vehicle is provided.

It should be noted that the relationship formula $$\varphi = \arctan\left(\frac{\mu b1 - a\tan\beta}{a + \mu b1\tan\alpha}\right)$$

is merely an example, and constitutes no limitation on the protection scope of this application. A simple transformation of the relationship formula also falls within the protection scope of this application.

With reference to the first aspect, in some implementations of the first aspect, the method further includes: determining, based on the orientation angle of the first vehicle and the body boundary line, 3D bounding box information corresponding to the first vehicle.

According to the method for obtaining 3D information of a vehicle provided in this application, the 3D bounding box information corresponding to the first vehicle may be further determined based on the obtained body boundary line of the first vehicle and the orientation angle that is of the first vehicle and that is determined based on the body boundary line of the first vehicle. A constraint on prediction of the 3D bounding box information is added by using the body boundary line of the first vehicle, so that obtaining accuracy of the 3D bounding box information corresponding to the first vehicle can be improved.

According to a second aspect, an apparatus for obtaining 3D information of a vehicle is provided. The apparatus for obtaining 3D information of a vehicle includes a processor, configured to implement the function of the terminal device in the method described in the first aspect.

Optionally, the apparatus for obtaining 3D information of a vehicle may further include a memory, the memory is coupled to the processor, and the processor is configured to implement the function of the terminal device in the method described in the first aspect.

In a possible implementation, the memory is configured to store program instructions and data. The memory is coupled to the processor, and the processor may invoke and execute the program instructions stored in the memory, to implement the function of the terminal device in the method described in the first aspect.

Optionally, the apparatus for obtaining 3D information of a vehicle may further include a communications interface, and the communications interface is used, by the apparatus for obtaining 3D information of a vehicle, to communicate with another device. When the apparatus for obtaining 3D information of a vehicle is a terminal device, the transceiver may be a communications interface or an input/output interface.

In a possible design, the apparatus for obtaining 3D information of a vehicle includes a processor and a communications interface, configured to implement the function of the terminal device in the method described in the first aspect. This specifically includes:

the processor communicates with the outside by using the communications interface; and the processor is configured to run a computer program, to enable the apparatus to implement any method described in the first aspect.

It may be understood that the outside may be an object other than the processor, or an object other than the apparatus.

In another implementation, when the apparatus for obtaining 3D information of a vehicle is a chip or a chip system, the communications interface may be an input/output interface, an interface circuit, an output circuit, an input circuit, a pin, or a related circuit in the chip or the chip system. The processor may be alternatively embodied as a processing circuit or a logic circuit.

According to a third aspect, a computer-readable storage medium is provided. A computer program is stored in the computer-readable storage medium. When the computer program is executed by a communications apparatus, the communications apparatus is enabled to implement the method in any one of the first aspect or the possible implementations of the first aspect.

According to a fourth aspect, a computer program product including instructions is provided. When the instructions are executed by a computer, a communications apparatus is enabled to implement the method in any one of the first aspect or the possible implementations of the first aspect.

According to a fifth aspect, a communications system is provided, including the apparatus for obtaining 3D information of a vehicle in the second aspect and an access network device.

DESCRIPTION OF EMBODIMENTS

The following describes technical solutions of this application with reference to the accompanying drawings.

Terms used in the following embodiments are merely intended to describe particular embodiments, but are not intended to limit this application. As used in the specification and the appended claims of this application, singular expressions "a", "the", and "this" are also intended to include plural expressions, for example, an expression "one or more", unless otherwise specified in the context clearly. It should be further understood that, in the following embodiments of this application, "at least one" or "one or more" means one, two, or more.

Reference to "an embodiment" "some embodiments", or the like in this specification means that a particular feature, structure, or characteristic described with reference to the embodiment is included in one or more embodiments of this application. Therefore, statements such as "in an embodiment", "in some embodiments", "in some other embodiments", and "in other embodiments" that appear at different places in this specification do not necessarily mean referring to a same embodiment. Instead, the statements mean "one or more but not all of embodiments", unless otherwise specifically emphasized in another manner. The terms "include", "contain", "have", and their variants all mean "include but are not limited to", unless otherwise specifically emphasized in another manner.

The technical solutions in the embodiments of this application may be applied to a vehicle to everything (vehicle to everything, V2X) communications system. As the society gradually develops, vehicles are becoming more popular. Driving facilitates people's travel, but also causes some adverse impact to the human society. A rapid increase in a quantity of vehicles causes a series of problems such as urban traffic congestion, frequent traffic accidents, and poor environmental quality. For a plurality of aspects such as personal safety, traffic travel efficiency, environmental protection, and economic effects, a perfect intelligent transportation system (intelligent transportation system, ITS) is required. Currently, the ITS has naturally become a global focus.

Currently, a vehicle may obtain road condition information or receive service information in a timely manner by using a vehicle to vehicle (vehicle to vehicle, V2V), vehicle to infrastructure (vehicle to infrastructure, V2I), vehicle to pedestrian (vehicle to pedestrian, V2P), or vehicle to network (vehicle to network, V2N) communication manner. These communication manners may be collectively referred to as V2X communication (X represents everything).

Figure 1:
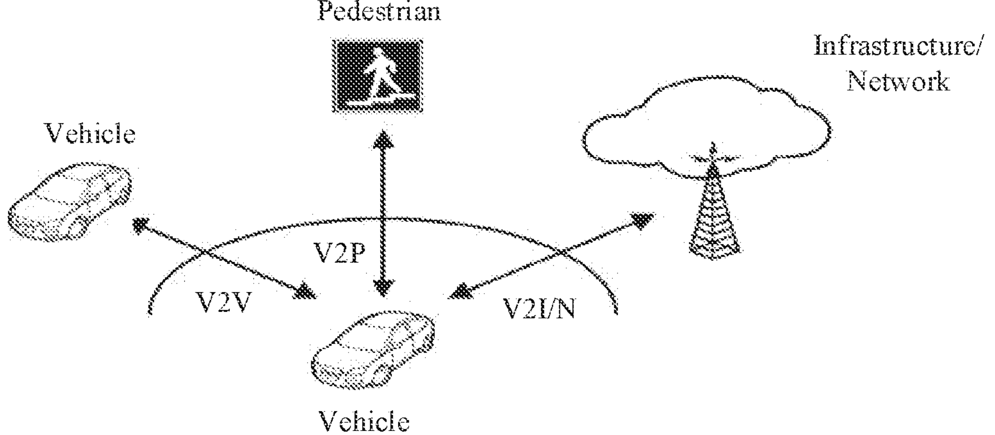
FIG. 1 is a schematic diagram of a V2X system.

FIG. 1 is a schematic diagram of a V2X system. The schematic diagram includes V2V communication, V2P communication, and V2I/N communication. As shown in FIG. 1, vehicles communicate with each other by using V2V. A vehicle may broadcast, to a surrounding vehicle, information such as a vehicle speed, a driving direction, a specific position, and whether the vehicle is sharply braked. A driver of the surrounding vehicle can better sense a traffic condition outside a visual distance by obtaining the information, to make advance determining on a dangerous condition and then make avoidance. A vehicle communicates with a roadside infrastructure through V2I, and the roadside infrastructure may provide various types of service information and data network access for the vehicle. Functions such as electronic toll collection and in-vehicle entertainment greatly improve traffic intelligence. The roadside infrastructure, for example, a roadside unit (road side unit, RSU), includes two types. One type is an RSU of a terminal device type. Because RSUs are distributed on a roadside, the RSU of the terminal device type is in a non-moving state, and therefore mobility does not need to be considered. The other type is an RSU of a network device type. The RSU of the network device type may provide timing synchronization and resource scheduling for a vehicle communicating with a network device. A vehicle communicates with a person (for example, the vehicle communicates with a pedestrian, the vehicle communicates with a person riding a bicycle, the vehicle communicates with a driver, or the vehicle communicates with a passenger) by using V2P. A vehicle communicates with a network by using V2N. V2N and V2I may be collectively referred to as V2I/N.

It should be understood that FIG. 1 is only an example schematic diagram shown fir describing the V2X system, and constitutes no limitation on this application. For example, a quantity of vehicles, a quantity of pedestrians, and a quantity of infrastructure each may be at least 2, rather than a quantity shown in FIG. 1.

FIG. 1 describes a scenario in which the embodiments of this application can be applied. To facilitate understanding of the technical solutions of this application, the following briefly describes several basic concepts in the technical solutions of this application.

1. Object Detection.

An object detection (object detection) task is an important task in the field of machine vision. An objective of the object detection is to find an interested object from an image or a video, and output both a position of the detected target and an object category of the detected target. For example, a manner of outputting an object category of a detected target and a minimum bounding box of the detected target in an image is referred to as 2D object detection. For another example, object detection through which an object category of a detected target and information such as a length, a width, a height, and a rotation angle of the detected target in three-dimensional space are output is referred to as 3D object detection.

It should be noted that the image in this application is an image of a target object detected by a terminal device, for example, an image of a detected target (a first vehicle) detected by a detection vehicle (a second vehicle), for example, a display image of the first vehicle in a central control screen of the second vehicle.

The object detection may also be referred to as object extraction, is target positioning that is based on geometric and statistical features of a target, and combines target positioning and identification. Accuracy and real-time performance of the object detection are an important capability of an entire system. Especially in a complex scenario, automatic target extraction and identification are particularly important when a plurality of targets need to be processed in real time.

With development of computer technologies and wide application of a computer vision principle, research on real-time target tracking performed by using a computer image processing technology is becoming more popular. Dynamic real-time target tracking and positioning has wide application value in intelligent transportation system, intelligent monitoring system, military object detection, surgical instrument positioning in medical navigation surgery, and the like.

In this embodiment of this application, a position of a detected target and an object category of the detected target may be obtained by still using an object detection technology in the conventional technology, or according to an object detection technology in a future technology. Therefore, a specific implementation of the object detection technology is not described in this application, and reference can be made to descriptions in the conventional technology.

2. 2D Bounding Box.

In a 2D object detection process, a bounding box (bounding box) is usually used to describe a position of a detected target. The bounding box is a rectangular box, and may be determined by using axis coordinates x1 and y1 in an upper left corner and axis coordinates x2 and y2 in a lower right corner of a rectangle.

It should be understood that, in the 2D object detection process, the bounding box is predicted by using a neural network. The neural network predicts a position and a size of a bounding box relative to a reference point, a category of an object in the bounding box, confidence at which the object exists, and confidence of the object category.

3. 3D Bounding Box.

The 3D bounding box is a minimum cuboid enveloping a vehicle in a camera coordinate system, and is visualized as a parallelogram mapped to a 2D image.

4. 3D Information.

3D information (for example, orientation angle information of another vehicle, observation angle information of a current vehicle for the another vehicle, or position information of the another vehicle) plays an important role in the field of automated driving object detection, for example, is used to predict an intention of the another vehicle, or evaluate a collision risk. The 3D information may be predicted by using a neural network, but 3D marked data is required in neural network training. It is difficult to mark angle information because it is difficult for a human eye to estimate an observation angle and an orientation angle.

Currently, point cloud matching is usually performed for 3D marked information of a vehicle by using a laser sensor, and a 3D positioning box and a global orientation angle of the vehicle are generated in simulation software based on a calibration parameter of the vehicle. However, the generated positioning box and orientation angle cannot be directly used. Due to driving dynamics (such as bumping) of the vehicle, manual matching with a photo is required in a later stage to generate final 3D information of the vehicle. In addition, 3D information marking with a laser radar is expensive, and is inconvenient to use because both data of a laser and data of an image are required during marking.

5. Body Boundary Line.

In a 2D bounding box of a vehicle, a boundary line at a boundary between a body and a head of the vehicle or a boundary line at a boundary between the body and a tail of the vehicle is referred to as a body boundary line.

Figure 2:
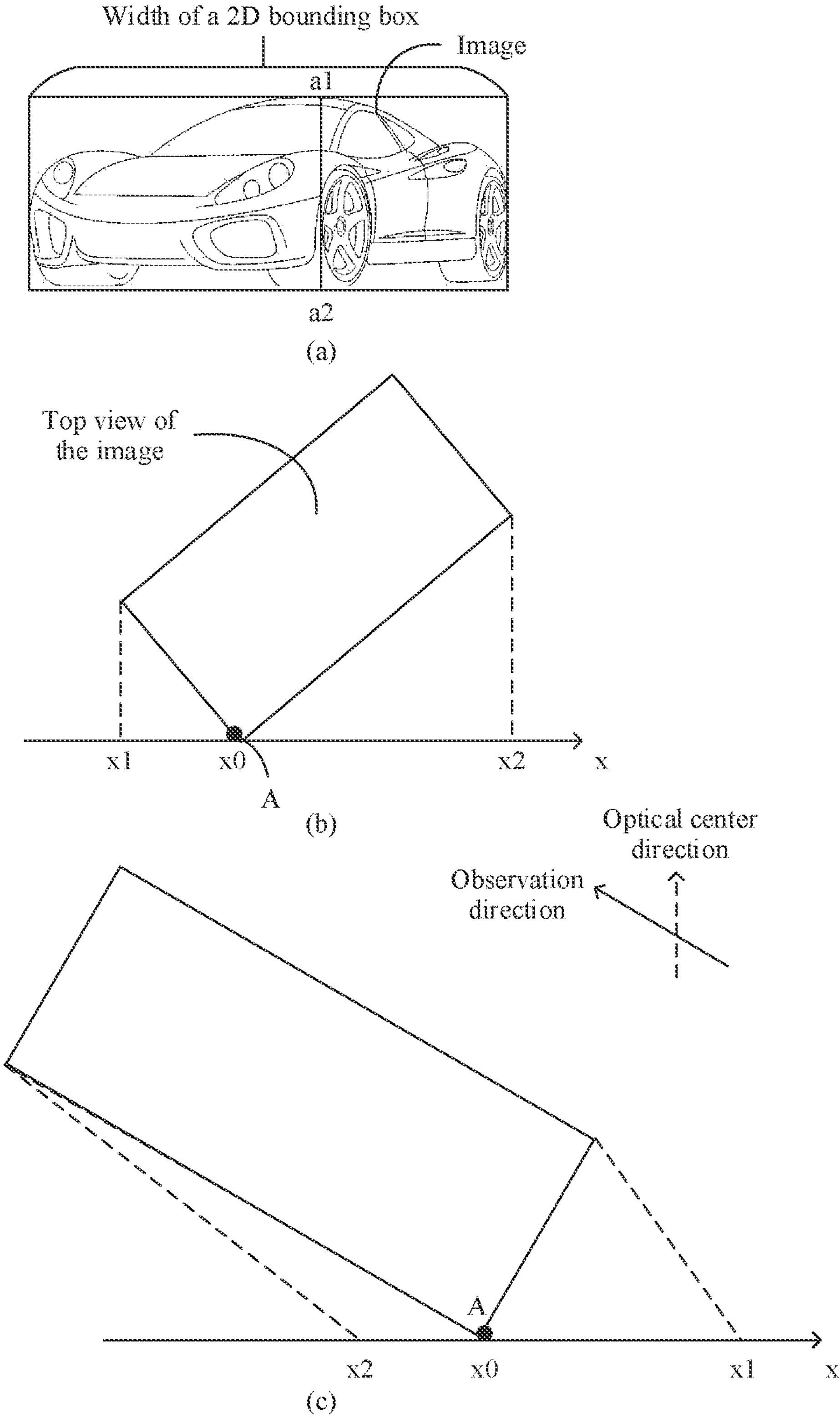
FIG. 2 is a schematic diagram of a body boundary line.

FIG. 2 is a schematic diagram of a body boundary line. It is assumed that a line of sight of an observation camera is parallel light, FIG. 2(*a*) is an image of a first vehicle, and FIG. 2(*b*) is a top view of the image. It can be seen from (a) and (b) in FIG. 2 that, a body boundary line of the first vehicle is displayed as a line segment a1a2 in the image of the first vehicle, the line segment a1a2 is displayed as a point A perpendicularly to an x-axis of the image, coordinates of A are (x0, 0), and a width of a 2D bounding box is represented as (ω=x2-x1. x2 is a horizontal coordinate value of a point as which a right edge of the 2D bounding box is displayed perpendicularly to the x-axis of the image, and x1 is a horizontal coordinate value of a point as which a left edge of the 2D bounding box is displayed perpendicularly to the x-axis of the image.

Specifically, a body of the first vehicle shown in (a) and (b) in FIG. 2 is on a right side of the 2D bounding box. A projection of a body length of the first vehicle in a direction parallel to an image plane is represented as a=x2-x0, and a projection of a body width of the first vehicle in the direction parallel to the image plane is represented as a=x0-x1. Likewise, if a body of the first vehicle is on a left side of the 2D bounding box, a projection of a body length of the first vehicle in a direction parallel to an image plane is represented as a=x0-x2, and a projection of a body width of the first vehicle in the direction parallel to the image plane is represented as a=x1-x0.

In addition, it should be noted that, as shown in (a) and (b) in FIG. 2, it is assumed that the line of sight of the observation camera is parallel light. If the line of sight of the observation camera is not parallel light, and a body of the first vehicle is on a left side of the 2D bounding box, a projection of a body length of the first vehicle in a direction parallel to an image plane is represented as a=x0-x2, and a projection of a body width of the first vehicle in the direction parallel to the image plane is represented as a=x1-x0.

It can be learned from the foregoing that, the projection of the body length of the first vehicle in the direction parallel to the image plane, and the projection of the body width of the first vehicle in the direction parallel to the image plane are related to the horizontal coordinate value of the point of the body boundary line of the first vehicle on the x-axis of the image, that is, the projection of the body length of the first vehicle in the direction parallel to the image plane and the projection of the body width of the first vehicle in the direction parallel to the image plane can be determined based on the body boundary line of the first vehicle.

6. Observation Angle.

The observation angle is an angle between a connection line direction between an observation camera and a body center of mass and an orientation direction of a head.

7. Orientation Angle.

Figure 3:
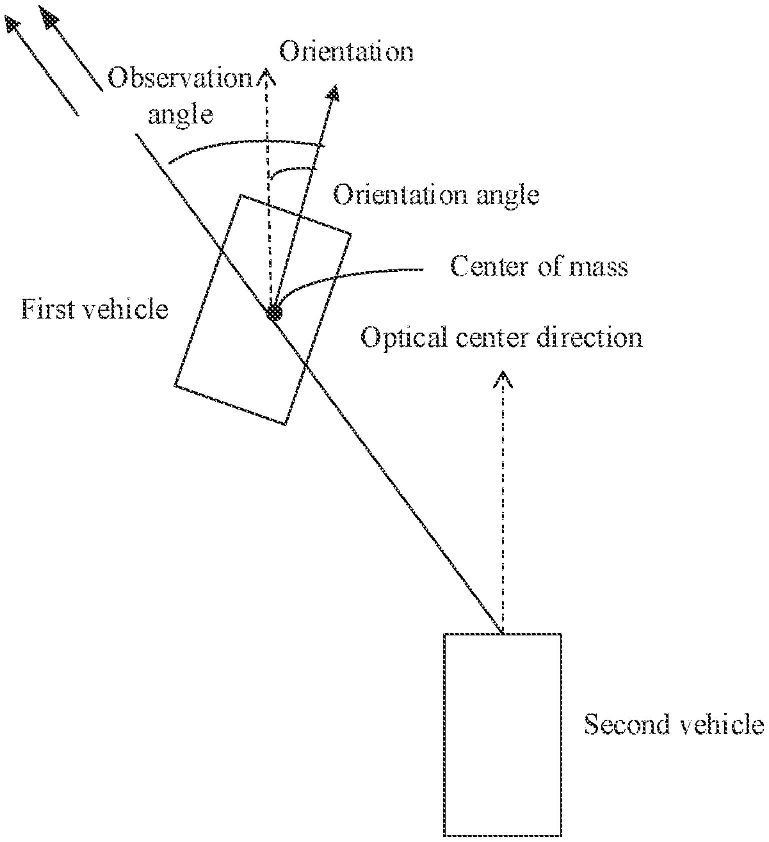
FIG. 3 is a schematic diagram of an observation angle and an orientation angle.

The orientation angle is an angle between an orientation direction of a head and an optical center direction of an observation camera. FIG. 3 is a schematic diagram of an observation angle and an orientation angle. It can be seen from FIG. 3 that a second vehicle is a vehicle in which an observation camera is located, and a first vehicle is an observed vehicle.

In the foregoing 3D object detection, 3D information needs to be marked. However, it is difficult to implement accurate marking by directly marking an angle and a 3D box in an image, and it is expensive to perform marking by using a laser point cloud. In addition, it is difficult to obtain accurate 3D information only from monocular vision. To resolve the defects in the conventional technology, this application provides a method for obtaining 3D information of a vehicle, so that 3D information can be inferred from 2D visual information, thereby optimizing a solution for obtaining 3D information from monocular vision.

The following describes, with reference to the accompanying drawings, the method for obtaining 3D information of a vehicle provided in this application.

Figure 4:
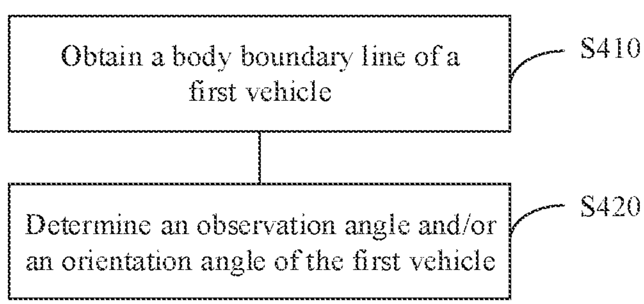
FIG. 4 is a schematic flowchart of a method for obtaining 3D information of a vehicle according to this application.

FIG. 4 is a schematic flowchart of a method for obtaining 3D information of a vehicle according to this application. The method includes at least some of the following steps.

S410. Obtain a body boundary line of a first vehicle.

In this embodiment of this application, an execution body that obtains the body boundary line of the first vehicle may be a terminal device near the first vehicle, for example, a second vehicle near the first vehicle, or a terminal device held by a pedestrian near the first vehicle. "Near the first vehicle" may indicate an orientation in which the first vehicle can be detected, for example, in front of, behind, or on a side of the first vehicle.

Considering that this application can be applied to a V2V scenario, description is provided by using an example in which the execution body that detects the first vehicle is a second vehicle.

For example, the first vehicle is a vehicle in front of the second vehicle, and the second vehicle can detect information (such as a position and a speed) related to the first vehicle, and control a speed and/or steering of the second vehicle based on the information related to the first vehicle, to avoid a collision with the first vehicle.

For example, the second vehicle may detect the first vehicle by using an in-vehicle apparatus (for example, a T-box) in the second vehicle. In this embodiment of this application, how the second vehicle detects the first vehicle is not limited, and reference can be made to an existing vehicle detection solution in the automated driving field.

In a possible implementation, in this embodiment of this application, after detecting the first vehicle, the second vehicle may obtain the body boundary line of the first vehicle through manual boundary line marking.

For example, the body boundary line of the first vehicle is marked in an obtained image of the first vehicle in a manual marking manner. It should be understood that, marking of length information is more accurate and easier to implement than marking of angle information.

In another possible implementation, in this embodiment of this application, after detecting the first vehicle, the second vehicle may obtain the body boundary line of the first vehicle by training a machine learning model regression boundary line.

For example, a machine learning model is established, and the machine learning model is trained to obtain the body boundary line of the first vehicle. A specific modeling manner is not limited in this embodiment of this application.

It should be understood that in this embodiment of this application, how to obtain the body boundary line of the first vehicle is not limited. The body boundary line of the first vehicle may be obtained according to an existing solution, or the body boundary line of the first vehicle may be obtained according to a solution provided in a future technology.

It should be further understood that in this embodiment of this application, the obtaining a body boundary line of a first vehicle may be understood as obtaining a horizontal coordinate value of a corresponding point of the body boundary line of the first vehicle on an x-axis of the image.

Further, after the body boundary line of the first vehicle is obtained, in this embodiment of this application, an observation angle and/or an orientation angle of the first vehicle may be determined based on the body boundary line. That is, the method procedure shown in FIG. 4 further includes S420: Determine the observation angle and/or the orientation angle of the first vehicle.

In a possible implementation, the determining the observation angle of the first vehicle includes: determining, based on the body boundary line and a width of a preset 2D bounding box, a projection of a body length of the first vehicle in a direction parallel to an image plane; and determining the observation angle of the first vehicle based on the projection of the body length of the first vehicle in the direction parallel to the image plane, the width of the preset 2D bounding box, and a preset length-to-width ratio of the first vehicle. The following describes, in detail with reference to FIG. 5, how to determine the observation angle of the first vehicle.

The direction parallel to the image plane in this application may also be understood as a plane perpendicular to an optical center direction, and the direction parallel to the image plane is a plane on which a front view of the image of the first vehicle is located.

Figure 5:
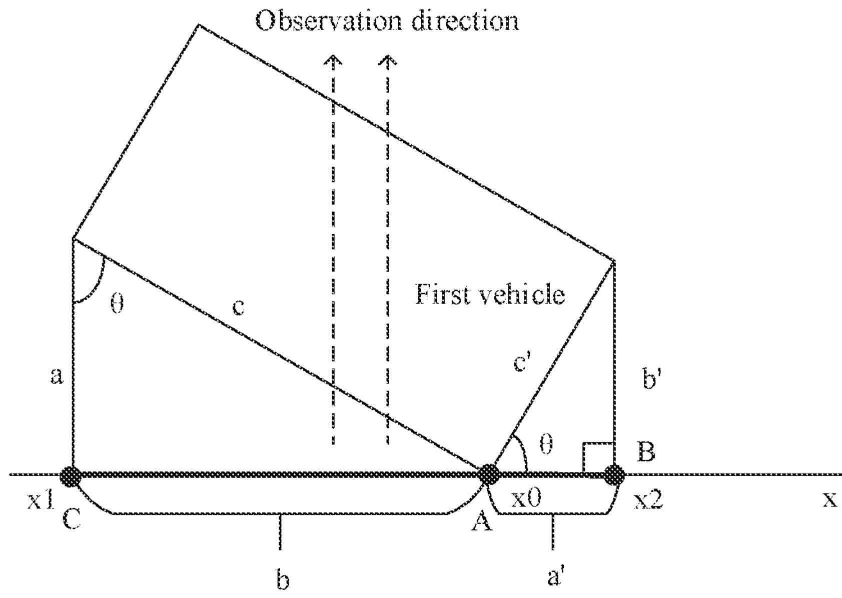
FIG. 5 is a schematic diagram of a relationship between a body boundary line and an observation angle according to an embodiment of this application.

FIG. 5 is a schematic diagram of a relationship between a body boundary line and an observation angle according to an embodiment of this application.

It can be seen from FIG. 5 that a position of the body boundary line of the vehicle in the bounding box is related to the observation angle. To simplify a problem, the following assumptions are made:

1. It is assumed that a line of sight of an observation vehicle (for example, the second vehicle) is parallel light.

2. It is assumed that a length-to-width ratio of an observed vehicle (for example, the first vehicle) is μ.

In FIG. 5, θ is the observation angle, c is the body length of the first vehicle, and c' is a tail (or head) width of the first vehicle. Because of the parallel light assumption, it may be considered that b is a projection that is of a body of the first vehicle and that is perpendicular to an observation direction, a' is a projection that is of a tail (or head) of the first vehicle and that is perpendicular to the observation direction, the two projections are equally proportional to the body length of the first vehicle and the tail (or head) width of the first vehicle in the image, A is a projection that is of the body boundary line and that is perpendicular to the observation direction (coordinates of A are (x0, 0)), B is a projection that is of a right edge of the 2D bounding box and that is perpendicular to the observation direction (coordinates of B are (x2, 0)), and C is a projection that is of a left edge of the 2D bounding box and that is perpendicular to the observation direction (coordinates of C are (x1, 0)). In this case, a' may be represented as x2-x0, and b may be represented as x0-x1.

It can be learned from FIG. 5 that, a triangle abc and a triangle a'b'c' are similar triangles, and the length-to-width ratio μ of the first vehicle is a similarity ratio of the two triangles, that is:

$$\mu = \frac{c}{c'} = \frac{a}{a'} = \frac{b}{b'}$$

Therefore, it can be learned that a relationship between the projection of the body width of the first vehicle in the direction parallel to the image plane and the observation angle includes:

$$\tan\theta = \frac{b}{a} = \frac{b}{\mu a'} = \frac{\omega - a'}{\mu a'},$$

where

ω in the formula is known and physically means the width of the 2D bounding box, and the following formula can be obtained by simply transforming the formula:

$$\theta = \arctan\left(\frac{\omega - a'}{\mu a'}\right);$$

and/or it can be learned that a relationship between the projection of the body length of the first vehicle in the direction parallel to the image plane and the observation angle includes:

$$\tan\theta = \frac{b}{a} = \frac{b}{\mu a'} = \frac{b}{\mu(\omega - b)},$$

where

ω in the formula is known and physically means the width of the 2D bounding box, and the following formula can be obtained by simply transforming the formula:

$$\theta = \arctan\left(\frac{b}{\mu(\omega - b)}\right)$$

In this embodiment of this application, how to determine the width of the 2D bounding box is not limited. The 2D bounding box may be determined with reference to a manner of determining a 2D bounding box in a current 2D object detection procedure, and then the width of the 2D bounding box may be determined. For example, the 2D bounding box may be manually marked or output by an object detection neural network, and then the width of the 2D bounding box may be determined by performing subtraction between corner point coordinates of the 2D bounding box.

It should be understood that in the relationship formula $$\theta = \arctan\left(\frac{\omega - a'}{\mu a'}\right), a' = x2 - x0,$$

and ω=x2-x0. In this case, the formula can be transformed into $$\theta = \arctan\left(\frac{(x2 - x1) - (x2 - x0)}{\mu(x2 - x0)}\right),$$

where x0 is the projection that is of the body boundary line of the first vehicle and that is perpendicular to the observation direction. Therefore, the formula can be understood as a specific form of a relationship between the body boundary line of the first vehicle and the observation angle of the first vehicle. However, in this application, the relationship between the body boundary line of the first vehicle and the observation angle of the first vehicle is not limited to being represented by only the relationship formula.

For example, the relationship between the body boundary line of the first vehicle and the observation angle of the first vehicle may be alternatively represented by a simple transformation $$\theta = \arctan\left(\frac{\omega - a'}{\mu a'} \pm \Delta\right)$$

of the relationship formula, where Δ may be understood as a corrected value.

Further, because there is a correspondence between the projection of the body width of the first vehicle in the direction parallel to the image plane and the observation angle of the first vehicle, after the body boundary line of the first vehicle is obtained, the projection of the body width of the first vehicle in the direction parallel to the image plane may be first determined, and then the observation angle of the first vehicle may be determined based on the projection of the body width of the first vehicle in the direction parallel to the image plane and the correspondence.

Specifically, a specific representation of the correspondence between the projection of the body width of the first vehicle in the direction parallel to the image plane and the observation angle of the first vehicle may be a calculation formula, for example, the foregoing formula $$\theta = \arctan\left(\frac{\omega - a'}{\mu a'}\right).$$

In this case, the observation angle of the first vehicle may be determined in a calculation manner. The projection of the body width of the first vehicle in the direction parallel to the image plane is first determined based on the body boundary line of the first vehicle, and then a value of the projection of the body width of the first vehicle in the direction parallel to the image plane is input based on the calculation formula met between the projection of the body width of the first vehicle in the direction parallel to the image plane and the observation angle of the first vehicle, to obtain a value of the observation angle of the first vehicle through calculation.

Alternatively, a specific representation of the correspondence between the projection of the body width of the first vehicle in the direction parallel to the image plane and the observation angle of the first vehicle may be a table. In this case, the observation angle of the first vehicle may be determined in a table lookup manner. A table is established based on the correspondence met between the projection of the body width of the first vehicle in the direction parallel to the image plane and the observation angle of the first vehicle, a value of the projection of the body width of the first vehicle in the direction parallel to the image plane is obtained, and a value of the observation angle of the first vehicle is queried from the table.

Costs of observation angle calibration are relatively high. This application mainly relates to obtaining the observation angle based on the body boundary line. However, there is no limitation that the body boundary line cannot be determined based on the observation angle. There is a correspondence between the body boundary line of the first vehicle and the observation angle of the first vehicle. Therefore, alternatively, the observation angle of the first vehicle may be first obtained, and then the body boundary line of the first vehicle may be determined based on the observation angle of the first vehicle.

It can be learned from the relationship between the projection of the body width of the first vehicle in the direction parallel to the image plane and the observation angle that, alternatively, the projection of the body width of the first vehicle in the direction parallel to the image plane may be determined based on the observation angle, and then the body boundary line of the first vehicle may be determined based on the projection of the body width of the first vehicle in the direction parallel to the image plane. Specifically, the following formula is met between the projection of the body width of the first vehicle in the direction parallel to the image plane and the observation angle:

$$a' = \frac{\omega}{\mu\tan\theta + 1}$$

The following formula is met between the projection of the body width of the first vehicle in the direction parallel to the image plane and the body boundary line of the first vehicle:

$$a' = x2 - x0$$

That is, the body boundary line of the first vehicle can be determined provided that the observation angle of the first vehicle is predicted, so that a quantity of predicted quantities is reduced.

Likewise, in the relationship formula $$\theta = \arctan\left(\frac{b}{\mu(\omega - b)}\right),\ b = x0 - x1,$$

and ω=x2-x1. In this case, the formula can be transformed into $$\theta = \arctan\left(\frac{(x0 - x1)}{\mu((x2 - x1) - (x0 - x1))}\right),$$

where x0 is the projection that is of the body boundary line of the first vehicle and that is perpendicular to the observation direction. Therefore, the formula can be understood as a specific form of a relationship between the body boundary line of the first vehicle and the observation angle of the first vehicle. However, in this application, the relationship between the body boundary line of the first vehicle and the observation angle of the first vehicle is not limited to being represented by only the relationship formula.

For example, the relationship between the body boundary line of the first vehicle and the observation angle of the first vehicle may be alternatively represented by a simple transformation $$\theta = \arctan\left(\frac{b}{\mu(\omega - b)} \pm \Delta\right)$$

of the relationship formula, where Δ may be understood as a corrected value.

Further, because there is a correspondence between the projection of the body length of the first vehicle in the direction parallel to the image plane and the observation angle of the first vehicle, after the body boundary line of the first vehicle is obtained, the projection of the body length of the first vehicle in the direction parallel to the image plane may be first determined, and then the observation angle of the first vehicle may be determined based on the projection of the body length of the first vehicle in the direction parallel to the image plane and the correspondence.

Specifically, a specific representation of the correspondence between the projection of the body length of the first vehicle in the direction parallel to the image plane and the observation angle of the first vehicle may be a calculation formula, for example, the foregoing formula $$\theta = \arctan\left(\frac{b}{\mu(\omega - b)}\right).$$

In this case, the observation angle of the first vehicle may be determined in a calculation manner. The projection of the body length of the first vehicle in the direction parallel to the image plane is first determined based on the body boundary line of the first vehicle, and then a value of the projection of the body length of the first vehicle in the direction parallel to the image plane is input based on the calculation formula met between the projection of the body length of the first vehicle in the direction parallel to the image plane and the observation angle of the first vehicle, to obtain a value of the observation angle of the first vehicle through calculation.

Alternatively, a specific representation of the correspondence between the projection of the body length of the first vehicle in the direction parallel to the image plane and the observation angle of the first vehicle may be a table. In this case, the observation angle of the first vehicle may be determined in a table lookup manner. A table is established based on the correspondence met between the projection of the body length of the first vehicle in the direction parallel to the image plane and the observation angle of the first vehicle, a value of the projection of the body length of the first vehicle in the direction parallel to the image plane is obtained, and a value of the observation angle of the first vehicle is queried from the table.

Costs of observation angle calibration are relatively high. This application mainly relates to obtaining the observation angle based on the body boundary line. However, there is no limitation that the body boundary line cannot be determined based on the observation angle. There is a correspondence between the body boundary line of the first vehicle and the observation angle of the first vehicle. Therefore, alternatively, the observation angle of the first vehicle may be first obtained, and then the body boundary line of the first vehicle may be determined based on the observation angle of the first vehicle.

It can be learned from the relationship between the projection of the body length of the first vehicle in the direction parallel to the image plane and the observation angle that, alternatively, the projection of the body length of the first vehicle in the direction parallel to the image plane may be determined based on the observation angle, and then the body boundary line of the first vehicle may be determined based on the projection of the body length of the first vehicle in the direction parallel to the image plane. Specifically, the following formula is met between the projection of the body length of the first vehicle in the direction parallel to the image plane and the observation angle:

$$b = \frac{\omega\mu\tan\theta}{\mu\tan\theta + 1}$$

The following formula is met between the projection of the body length of the first vehicle in the direction parallel to the image plane and the body boundary line of the first vehicle:

$$b = x0 - x1$$

That is, the body boundary line of the first vehicle can be determined provided that the observation angle of the first vehicle is predicted, so that a quantity of predicted quantities is reduced.

Because the parallel light assumption does not hold when a target is at a relatively short distance (for example, a distance between the first vehicle and the second vehicle is relatively short and is less than 5 m), this application provides an observation angle correction method in a short distance case: An approximate target distance is obtained by using a calibration parameter and an approximate touchdown point of an object, and a projection that is of a body or a tail and that is perpendicular to an observation direction may be corrected by using the approximate target distance. The calibration parameter includes a geometric model parameter of camera imaging, and the calibration parameter may be used to determine a relationship between a three-dimensional geometric position of a point on a spatial object surface and a corresponding point of the point in an image. A midpoint of a lower edge of a 2D bounding box of the object may be considered as the approximate touchdown point of the object. Because it is known that the touchdown point is at a ground height, a position of the object in 3D space may be estimated by using a position of the point in the image and the calibration parameter.

In addition, the length-to-width ratio of the first vehicle is preset. In this case, another error control measure is presetting different length-to-width ratios for different types of vehicles, such as a car and a truck.

The observation angle represents only an observation direction of the second vehicle for the first vehicle, and the orientation angle is an angle between a driving direction of the vehicle (an optical center direction of a camera) and an orientation direction of the vehicle. Actually, an orientation angle in a vehicle coordinate system plays a more important role in control of automated driving. The following describes how to determine the orientation angle of the first vehicle based on the body boundary line of the first vehicle.

In a possible implementation, the determining the orientation angle of the first vehicle includes: first determining, based on the body boundary line of the first vehicle and the width of the preset 2D bounding box, the projection of the body width of the first vehicle in the direction parallel to the image plane, and determining, based on the body boundary line of the first vehicle and the length of the preset 2D bounding box, the projection of the body width of the first vehicle in the direction parallel to the image plane, and then determining the orientation angle of the first vehicle based on the projection of the body width of the first vehicle in the direction parallel to the image plane, the projection of the body length of the first vehicle in the direction parallel to the image plane, respective angles between the two edges of the preset 2D bounding box and an optical center, and the preset length-to-width ratio of the first vehicle.

Figure 6:
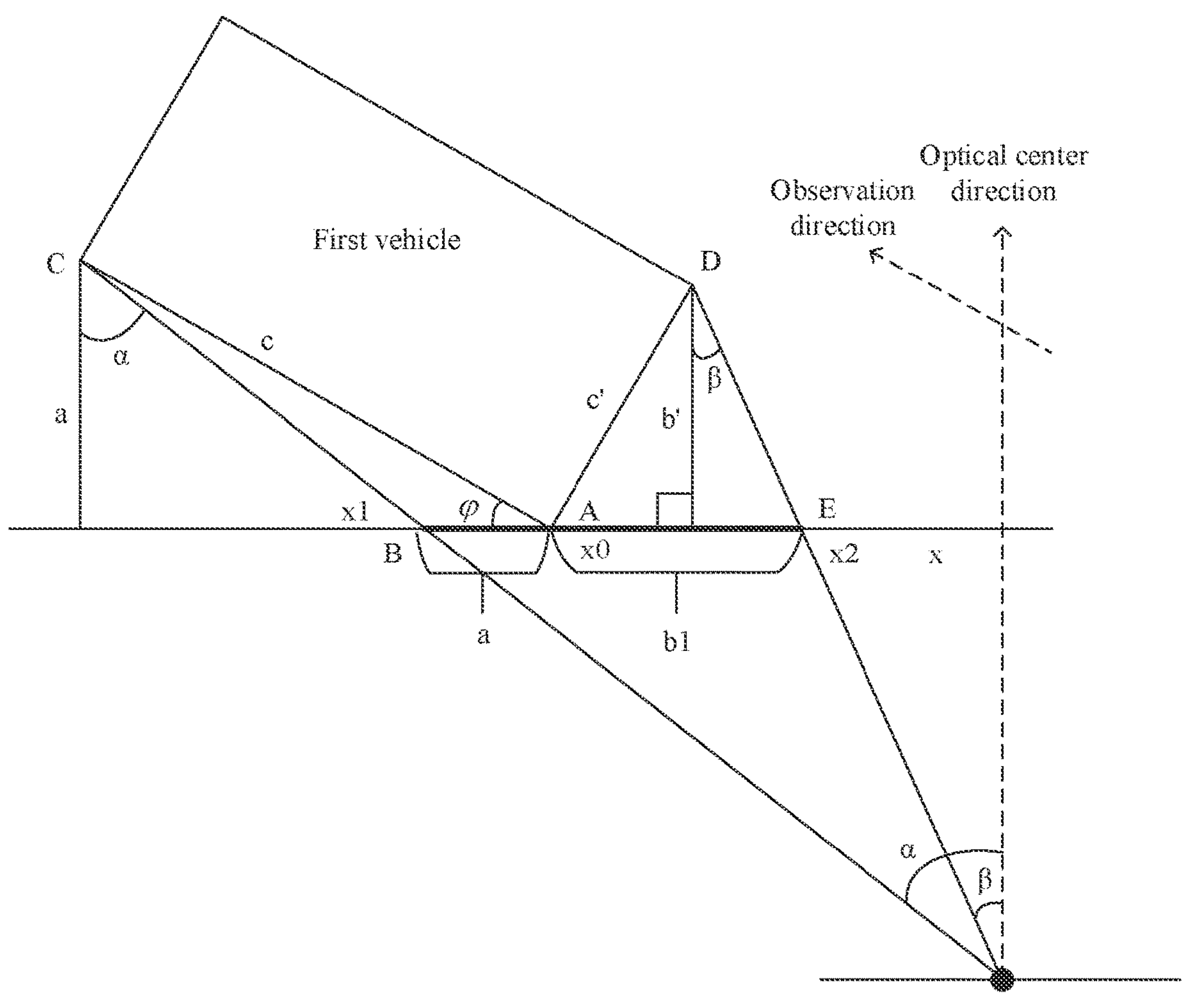
FIG. 6 is a schematic diagram of a relationship between a body boundary line and an orientation angle according to an embodiment of this application.

FIG. 6 is a schematic diagram of a relationship between a body boundary line and an orientation angle according to an embodiment of this application. It can be seen from FIG. 6 that the position of the body boundary line of the vehicle in the bounding box is related to the orientation angle. φ shown in FIG. 6 is the orientation angle, c=AC is set to an actual body length of the first vehicle, and c'=AD is set to an actual tail (or head) width of the first vehicle. α=AB is set to an actual projection of the body length of the first vehicle in the direction parallel to the image plane, b1=AE is set to the projection of the body (tail or head) width of the first vehicle in the direction parallel to the image plane, A is the projection that is of the body boundary line and that is perpendicular to the observation direction (coordinates of A are (x0, 0)), E is the projection that is of the right edge of the 2D bounding box and that is perpendicular to the observation direction (coordinates of E are (x2, 0)), and B is the projection that is of the left edge of the 2D bounding box and that is perpendicular to the observation direction (coordinates of B are (x1, 0)). In this case, a may be represented as x0-x1, and b1 may be represented as x2-x0.

The angles α and β between the two edges of the 2D bounding box and the optical center may be calculated by using a position of the 2D bounding box in the image and a calibration parameter:

$$\alpha = \arctan\frac{x_{left} - c_x}{f_x};\ \text{and}$$

$$\beta = \arctan\frac{x_{right} - c_x}{f_x},$$

where $c_x$ is a position of the optical center on the x-axis of the image, $f_x$ is a focal length of the camera, $x_{left}$ is a position of the left edge of the 2D bounding box on the x-axis of the image, and $x_{right}$ is a position of the right edge of the bounding box on the x-axis of the image.

It should be understood that, to determine α, an equal height point, namely, a point #1, of the left edge of the 2D bounding box as the optical center is first determined, and an angle between a connection line between the point #1 and the optical center and the optical center direction is α. Likewise, to determine β, an equal height point, namely, a point #2, of the right edge of the 2D bounding box as the optical center is first determined, and an angle between a connection line between the point #2 and the optical center and the optical center direction is β. The point #1, the point #2, and the optical center are coplanar. In this embodiment of this application, how to determine α and β is not limited, and α and β may be determined with reference to a position of a 2D bounding box in an image in current 2D object detection and a calibration parameter.

For a triangle ΔABC in FIG. 6, the following formula can be obtained by applying the law of sines:

$$\frac{a}{\sin\left(\frac{\pi}{2} - \varphi - \alpha\right)} = \frac{c}{\sin\left(\alpha + \frac{\pi}{2}\right)},$$

where an angle corresponding to a side length a of $$\Delta ABC \text{ is } \frac{\pi}{2} - \varphi - \alpha,$$

and an angle corresponding to aside length c of ΔABC is $$\alpha + \frac{\pi}{2}.$$

After sorting, the following formula can be obtained:

$$c\cos(\varphi + \alpha) = a\cos\alpha$$

Likewise, for a triangle ΔADE in FIG. 6, the following formula can be obtained by applying the law of sines:

$$\frac{b1}{\sin(\beta + \varphi)} = \frac{c'}{\sin\left(\frac{\pi}{2} - \beta\right)},$$

where an angle corresponding to a side length b1 of ΔADE is β+φ, and an angle corresponding to a side length c' of ΔADE is $$\frac{\pi}{2} - \beta.$$

After sorting, the following formula can be obtained:

$$c'\sin(\beta + \varphi) = b1\cos\beta$$

However, because the body length of the first vehicle and the tail (or the head) width of the first vehicle are not known, the following relationship formula can be obtained by dividing $$c\cos(\varphi + \alpha) = a\cos\alpha \text{ by } c'\sin(\beta + \varphi) = b1\cos\beta:$$

$$\frac{\cos(\varphi+\alpha)}{\sin(\beta+\varphi)}=\frac{a\cos\alpha}{\mu b1\cos\beta},$$

where $$\mu=\frac{c}{c'}$$

is the length-to-width ratio of the first vehicle.

Therefore, it can be learned that a relationship between the projection of the body length of the first vehicle in the direction parallel to the image plane, the projection of the body width of the first vehicle in the direction parallel to the image plane, and the orientation angle is as follows:

$$\tan\varphi=\frac{\mu b1-a\tan\beta}{a+\mu b1\tan\alpha},$$

where a is the projection of the body length of the first vehicle in the direction parallel to the image plane, b1 is the body boundary line, α is an angle between the left edge of the 2D bounding box and the optical center, and β is an angle between the right edge of the 2D bounding box and the optical center, and φ is the orientation angle of the first vehicle.

The following formula can be obtained by simply transforming the formula:

$$\varphi=\arctan\left(\frac{\mu b1-a\tan\beta}{a+\mu b1\tan\alpha}\right)$$

It should be understood that in the relationship formula $$\varphi=\arctan\left(\frac{\mu b1-a\tan\beta}{a+\mu b1\tan\alpha}\right),$$

a=x0-x1, and b1=x2-x0. In this case, the formula can be transformed into $$\varphi=\arctan\left(\frac{\mu(x2-x0)-(x0-x1)\tan\beta}{(x0-x1)+\mu(x2-x0)\tan\alpha}\right),$$

where x0 is the projection that is of the body boundary line of the first vehicle and that is perpendicular to the observation direction. Therefore, the formula can be understood as a specific form of a relationship between the body boundary line of the first vehicle and the orientation angle of the first vehicle. However, in this application, the relationship between the body boundary line of the first vehicle and the orientation angle of the first vehicle is not limited to being represented by only the relationship formula.

For example, the relationship between the body boundary line of the first vehicle and the orientation angle of the first vehicle may be alternatively represented by a simple transformation $$\varphi=\arctan\left(\frac{\mu b1-a\tan\beta}{a+\mu b1\tan\alpha}\pm\Delta\right)$$

of the relationship formula, where Δ may be understood as a corrected value.

Further, because there is a correspondence between the projection of the body width of the first vehicle in the direction parallel to the image plane, the projection of the body length of the first vehicle in the direction parallel to the image plane, and the orientation angle of the first vehicle, after the body boundary line of the first vehicle is obtained, the projection of the body width of the first vehicle in the direction parallel to the image plane and the projection of the body length of the first vehicle in the direction parallel to the image plane may be first determined, and then the orientation angle of the first vehicle may be determined based on the projection of the body width of the first vehicle in the direction parallel to the image plane, the projection of the body length of the first vehicle in the direction parallel to the image plane, and the correspondence.

Specifically, a specific representation of the correspondence between the projection of the body width of the first vehicle in the direction parallel to the image plane, the projection of the body length of the first vehicle in the direction parallel to the image plane, and the orientation angle of the first vehicle may be a calculation formula, for example, the foregoing formula $$\varphi=\arctan\left(\frac{\mu b1-a\tan\beta}{a+\mu b1\tan\alpha}\right).$$

In this case the orientation angle of the first vehicle may be determined in a calculation manner. The projection of the body width of the first vehicle in the direction parallel to the image plane and the projection of the body length of the first vehicle in the direction parallel to the image plane are first determined based on the body boundary line of the first vehicle, and then values of the projection of the body width of the first vehicle in the direction parallel to the image plane and the projection of the body length of the first vehicle in the direction parallel to the image plane are input based on the calculation formula met between the projection of the body width of the first vehicle in the direction parallel to the image plane, the projection of the body length of the first vehicle in the direction parallel to the image plane, and the orientation angle of the first vehicle, to obtain a value of the orientation angle of the first vehicle through calculation.

Alternatively, a specific representation of the correspondence between the projection of the body width of the first vehicle in the direction parallel to the image plane, the projection of the body length of the first vehicle in the direction parallel to the image plane, and the orientation angle of the first vehicle may be a table. In this case, the orientation angle of the first vehicle may be determined in a table lookup manner. A table is established based on the correspondence between the projection of the body width of the first vehicle in the direction parallel to the image plane, the projection of the body length of the first vehicle in the direction parallel to the image plane, and the orientation angle of the first vehicle, obtain values of the projection of the body width of the first vehicle in the direction parallel to the image plane and the projection value of the body length of the first vehicle in the direction parallel to the image plane, and a value of the orientation angle of the first vehicle is queried from the table.

Costs of orientation angle calibration are relatively high. This application mainly relates to obtaining the orientation angle based on the body boundary line. However, there is no limitation that the body boundary line cannot be determined based on the orientation angle. There is a correspondence between the body boundary line of the first vehicle and the orientation angle of the first vehicle. Therefore, alternatively, the orientation angle of the first vehicle may be first obtained, and then the body boundary line of the first vehicle may be determined based on the orientation angle of the first vehicle. That is, the body boundary line of the first vehicle can be determined provided that the orientation angle of the first vehicle is predicted, so that a quantity of predicted quantities is reduced.

The foregoing formula $$\varphi = \arctan\left(\frac{\mu b1 - a\tan\beta}{a + \mu b1\tan\alpha}\right)$$

is applicable to a case in which the first vehicle is located on a left side of an optical center extension line. In a case in which the first vehicle is located on or on a right side of the optical center extension line, only a positive or negative symbol change needs to be performed on the angles α and β. Details are not described herein.

Further, after the orientation angle is determined based on the body boundary line, 3D bounding box information corresponding to the first vehicle may be determined based on the orientation angle of the first vehicle and the body boundary line.

Specifically, the following formula can be obtained by using a camera projection principle:

$$\begin{pmatrix} x \\ y \\ 1 \end{pmatrix} = K[R \quad T]\begin{pmatrix} X \\ Y \\ Z \\ 1 \end{pmatrix},$$

where (x, y, 1) indicates coordinates of a point of the 2D bounding box of the first vehicle, (X, Y, Z, 1) indicates coordinates in a 3D box in a 3D camera coordinate system, and K, R, and T are calibration parameters. K is an intrinsic camera parameter matrix. R and T are extrinsic camera parameters, and R and T are a rotation matrix and a translation vector of the camera coordinate system relative to the vehicle coordinate system.

It is assumed that a rolling angle is zero relative to a horizontal plane, and a tilting angle is the length-to-width ratio of the first vehicle relative to the horizontal plane, the following formula can be obtained:

$$T = \begin{pmatrix} t_x \\ t_y \\ t_z \end{pmatrix}, R = \begin{pmatrix} \mu\cos\varphi & 0 & \sin\varphi \\ 0 & 1 & 0 \\ -\sin\varphi & 0 & \cos\varphi \end{pmatrix},$$

and X=μz, where

φ is the orientation angle, five remaining unknown numbers are $t_x$, $t_y$, $t_r$, Y, and Z, and all corresponding unknown 3D information may be solved based on a total of five pieces of information: four boundaries of the 2D bounding box and body boundary line information. A more fitting 3D bounding box may be obtained with constraint of the body boundary line.

It should be understood that, if an actual size and an observation angle of a vehicle are output by using a neural network, to infer all 3D information of an observed target, it is difficult to accurately predict a size of the vehicle in actual space due to a lack of scale information of a monocular image. In contrast, a constraint on prediction of the 3D information is added by using the body boundary line, and a vehicle length and width with relatively high prediction difficulty are solved by using a camera equation, instead of being inferred by using a picture, thereby improving determining accuracy of the 3D information.

It should be understood that, in the foregoing method embodiment, the apparatus for obtaining 3D information of a vehicle may perform some or all of the steps in the embodiment. These steps or operations are merely examples. This embodiment of this application may further include performing other operations or variants of various operations.

It should be further understood that, in the embodiments of this application, if no special description or logic conflict exists, consistency may exist and mutual reference may be made between terms and/or descriptions in different embodiments, and technical features in different embodiments may be combined into a new embodiment according to an internal logical relationship.

The foregoing describes, in detail with reference to FIG. 4, the method for obtaining 3D information of a vehicle. The following describes, in detail with reference to FIG. 7 and FIG. 8, an apparatus for obtaining 3D information of a vehicle provided in the embodiments of this application.

Figure 7:
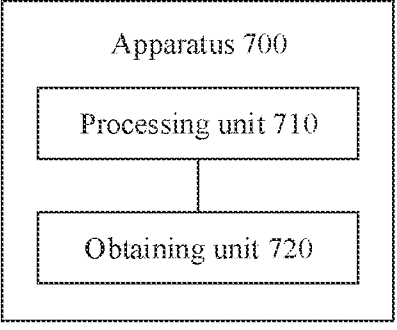
FIG. 7 is a schematic diagram of an apparatus 700 for obtaining 3D information of a vehicle according to this application.

FIG. 7 is a schematic diagram of an apparatus 700 for obtaining 3D information of a vehicle according to this application. As shown in FIG. 7, the apparatus 700 includes a processing unit 710 and an obtaining unit 720.

The obtaining unit 720 is configured to obtain a body boundary line of a first vehicle.

The processing unit 710 is configured to determine an observation angle of the first vehicle and/or an orientation angle of the first vehicle based on the body boundary line.

For example, that the processing unit 710 determines an observation angle of the first vehicle based on the body boundary line includes:

the processing unit 710 determines, based on the body boundary line and a width of a preset 2D bounding box, a projection of a body length of the first vehicle and/or a projection of a body width of the first vehicle in a direction parallel to an image plane, and the processing unit 710 determines the observation angle of the first vehicle based on the projection of the body length of the first vehicle and/or the projection of the body width of the first vehicle in the direction parallel to the image plane, the width of the preset 2D bounding box, and a preset length-to-width ratio of the first vehicle.

For example, that the processing unit 710 determines an orientation angle of the first vehicle based on the body boundary line includes:

the processing unit 710 determines, based on the body boundary line and the width of the preset 2D bounding box, the projection of the body length of the first vehicle in the direction parallel to the image plane; the processing unit 710 determines, based on the body boundary line and the width of the preset 2D bounding box, the projection of the body width of the first vehicle in the direction parallel to the image plane; and the processing unit 710 predicts the orientation angle of the first vehicle based on the projection of the body width of the first vehicle in the direction parallel to the image plane, the projection of the body length of the first vehicle in the direction parallel to the image plane, respective angles between two edges of the preset 2D bounding box and an optical center, and the preset length-to-width ratio of the first vehicle.

For example, the processing unit 710 is further configured to determine, based on the orientation angle of the first vehicle and the body boundary line, 3D bounding box information corresponding to the first vehicle.

The apparatus 700 completely corresponds to the second vehicle in the method embodiment. The apparatus 700 may be the second vehicle in the method embodiment, or a chip or a functional module inside the second vehicle in the method embodiment. The corresponding units of the apparatus 700 are configured to perform the corresponding steps performed by the second vehicle in the method embodiment shown in FIG. 4.

The processing unit 710 in the apparatus 700 is configured to perform a processing-related step corresponding to the second vehicle in the method embodiment, for example, perform step S420 of determining the observation angle and/or the orientation angle of the first vehicle in FIG. 4.

The obtaining unit 720 in the apparatus 700 performs an obtaining step of the second vehicle in the method embodiment, for example, perform step S410 of obtaining the body boundary line of the first vehicle in FIG. 4. The apparatus 700 may further include a sending unit for performing a sending step of the second vehicle.

The obtaining unit 720 and the sending unit may form a transceiver unit, having both a receiving function and a sending function. The processing unit 710 may be at least one processor. The sending unit may be a transmitter or an interface circuit. The obtaining unit 720 may be a receiver or an interface circuit. The receiver and the transmitter may be integrated to form a transceiver or an interface circuit.

Optionally, the apparatus 700 may further include a storage unit, configured to store data and/or signaling. The processing unit 710, the sending unit, and the obtaining unit 720 may interact with or be coupled to the storage unit, to, for example, read or invoke the data and/or the signaling in the storage unit, so that the method in the foregoing embodiment is performed.

The foregoing units may independently exist, or may be completely or partially integrated.

Figure 8:
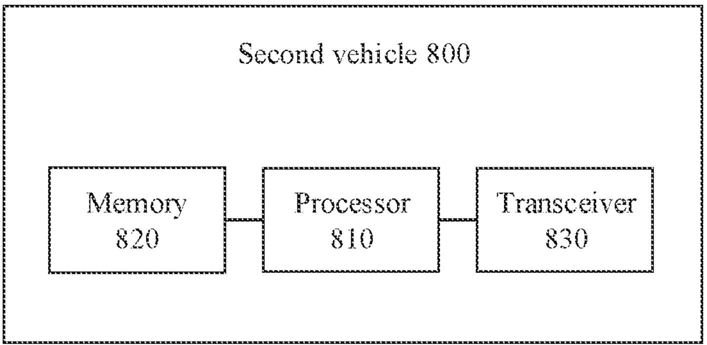
FIG. 8 is a schematic diagram of a structure of a second vehicle 800 applicable to an embodiment of this application.

FIG. 8 is a schematic diagram of a structure of a second vehicle 800 applicable to an embodiment of this application. The second vehicle 800 may be configured to implement the function of the second vehicle in the foregoing method for obtaining 3D information of a vehicle. The second vehicle 800 includes a processor 810, a memory 820, and a transceiver 830. The memory 820 stores instructions or a program, and the processor 810 is configured to execute the instructions or the program stored in the memory 820. When the instructions or the program stored in the memory 820 are or is executed, the transceiver 830 is configured to perform the operation performed by the obtaining unit 720 in the apparatus 700 shown in FIG. 7.

An embodiment of this application further provides a communications system, including the foregoing second vehicle and an access network device.

An embodiment of this application further provides a communications system, including the foregoing second vehicle, the foregoing first vehicle, and an access network device.

This application further provides a computer-readable storage medium. Instructions are stored in the computer-readable storage medium. When the instructions run on a computer, the computer is enabled to perform the steps performed by the second vehicle in the foregoing method shown in FIG. 4.

This application further provides a computer program product including instructions. When the computer program product runs on a computer, the computer is enabled to perform the steps performed by the first vehicle in the foregoing method shown in FIG. 4.

This application further provides a chip, including a processor. The processor is configured to read and run a computer program stored in a memory, to perform a corresponding operation and/or procedure that are/is performed by the second vehicle in the method for obtaining 3D information of a vehicle provided in this application. Optionally, the chip further includes a memory, the memory is connected to the processor by using a circuit or a wire, and the processor is configured to read and execute a computer program in the memory. Further, optionally, the chip further includes a communications interface, and the processor is connected to the communications interface. The communications interface is configured to receive processed data and/or information, and the processor obtains the data and/or the information from the communications interface, and processes the data and/or the information. The communications interface may be an input/output interface, an interface circuit, an output circuit, an input circuit, a pin, a related circuit, or the like in the chip. The processor may be alternatively embodied as a processing circuit or a logic circuit.

The chip may be alternatively replaced with a chip system, and details are not described herein.

In addition, in this application, terms such as "include", "have", and any variations thereof are intended to cover non-exclusive inclusions, for example, a process, method, system, product, or device that includes a series of steps or units is not necessarily limited to those clearly listed steps or units, but may include other steps or units that are not clearly listed or inherent to such a process, method, product, or device.

A person of ordinary skill in the art may be aware that, in combination with the examples described in embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In several embodiments provided in this application, it should be understood that the disclosed system, apparatus, and method may be implemented in another manner. For example, the described apparatus embodiment is merely an example. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or another form.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of embodiments.

In addition, function units in embodiments of this application may be integrated into one processing unit, each of the units may exist alone physically, or two or more units may be integrated into one unit.

When the functions are implemented in the form of a software functional unit and sold or used as an independent product, the functions may be stored in a computer-readable storage medium. Based on such an understanding, the technical solutions of this application essentially, or the part contributing to the current technology, or some of the technical solutions may be implemented in a form of a software product. The computer software product is stored in a storage medium, and includes several instructions for instructing a computer device (which may be a personal computer, a server, or a network device) to perform all or some of the steps of the methods described in embodiments of this application. The foregoing storage medium includes any medium that can store program code, such as a USB flash drive, a removable hard disk, a read-only memory (Read-Only Memory, ROM), a random access memory (Random Access Memory, RAM), a magnetic disk, or an optical disc.

The term "and/or" in this application describes only an association relationship for describing associated objects and represents that three relationships may exist. For example, A and/or B may represent the following three cases: Only A exists, both A and B exist, and only B exists. In addition, the character "/" in this specification usually represents an "or" relationship between associated objects. In this application, the term "at least one" may represent "one" or "two or more". For example, at least one of A, B, and C may represent the following seventh cases: Only A exists, only B exists, only C exists, both A and B exist, both A and C exist, and both C and B exist, and A, B, C all exist.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method for obtaining three dimensional (3D) information of a vehicle, comprising:

obtaining a body boundary line of a first vehicle, wherein the body boundary line comprises a boundary line at a boundary between a body and a head of the first vehicle, or a boundary line at a boundary between the body and a tail of the first vehicle; and determining at least one of an observation angle of the first vehicle or an orientation angle of the first vehicle based on the body boundary line, wherein the determining the observation angle of the first vehicle based on the body boundary line comprises:

determining, based on the body boundary line and a width of a preset two dimensional (2D) bounding frame, a projection of a body length of the first vehicle or a projection of a body width of the first vehicle on a plane perpendicular to an optical center direction; and determining the observation angle of the first vehicle based on the projection of the body length of the first vehicle or the projection of the body width of the first vehicle on the plane perpendicular to the optical center direction, the width of the preset 2D bounding box, and a known value representing a preset actual length-to-width ratio of the first vehicle, wherein the observation angle of the first vehicle, the projection of the body length of the first vehicle or the projection of the body width of the first vehicle on the plane perpendicular to the optical center direction, the width of the preset 2D bounding box, and the known value representing the preset actual length-to-width ratio of the first vehicle meet a preset condition; and wherein the projection of the body width of the first vehicle on the plane perpendicular to the optical center direction, the width of the preset 2D bounding box, and the preset actual length-to-width ratio of the first vehicle meet $$\theta = \arctan\left(\frac{\omega - a'}{\mu a'}\right)$$

with the observation angle of the first vehicle, the projection of the body length of the first vehicle on the plane perpendicular to the optical center direction, the width of the preset 2D bounding box, and the preset actual length-to-width ratio of the first vehicle meet $$\theta = \arctan\left(\frac{b}{\mu(\omega - b)}\right)$$

with the observation angle of the first vehicle, wherein $\omega$ is the width of the preset 2D bounding box, $\mu$ is the preset actual length-to-width ratio of the first vehicle, $\alpha'$ is the projection of the body width of the first vehicle in a direction parallel to an image plane, b is the projection of the body length of the first vehicle in the direction parallel to the image plane, and $\theta$ is the observation angle.

2. The method according to claim 1, wherein the determining the orientation angle of the first vehicle based on the body boundary line comprises:

determining, based on the body boundary line and the width of the preset 2D bounding box, the projection of the body length of the first vehicle in the direction parallel to the image plane;

determining, based on the body boundary line and the width of the preset 2D bounding box, the projection of the body width of the first vehicle in the direction parallel to the image plane; and determining the orientation angle of the first vehicle based on the projection of the body width of the first vehicle on the plane perpendicular to the optical center direction, the projection of the body length of the first vehicle on the plane perpendicular to the optical center direction, respective angles between two edges of the preset 2D bounding box and an optical center, and the preset actual length-to-width ratio of the first vehicle.

3. The method according to claim 2, wherein the projection of the body width of the first vehicle on the plane perpendicular to the optical center direction, the projection of the body length of the first vehicle on the plane perpendicular to the optical center direction, the respective angles between the two edges of the preset 2D bounding box and the optical center, and the preset actual length-to-width ratio of the first vehicle meet $$\varphi = \arctan\left(\frac{\mu b1 - a\tan\beta}{a + \mu b1\tan\alpha}\right)$$

with the orientation angle of the first vehicle, wherein a is the projection of the body length of the first vehicle on the plane perpendicular to the optical center direction, b1 is the projection of the body width of the first vehicle on the plane perpendicular to the optical center direction, α is an angle between a left edge of the 2D bounding box and the optical center, β is an angle between a right edge of the 2D bounding box and the optical center, and φ is the orientation angle of the first vehicle, and μ is the preset actual length-to-width ratio of the first vehicle.

4. The method according to claim 1, wherein the method further comprises:

determining, based on the orientation angle of the first vehicle and the body boundary line, 3D bounding box information corresponding to the first vehicle.

5. An apparatus, comprising:

at least one processor; and one or more memories coupled to the at least one processor and storing programming instructions for execution by the at least one processor to cause the apparatus to:

obtain a body boundary line of a first vehicle, wherein the body boundary line comprises a boundary line at a boundary between a body and a head of the first vehicle, or a boundary line at a boundary between the body and a tail of the first vehicle; and determine at least one of an observation angle of the first vehicle or an orientation angle of the first vehicle based on the body boundary line, wherein the determine the observation angle of the first vehicle based on the body boundary line comprises:

determine, based on the body boundary line and a width of a preset two dimensional (2D) bounding frame, a projection of a body length of the first vehicle or a projection of a body width of the first vehicle on a plane perpendicular to an optical center direction; and determine the observation angle of the first vehicle based on the projection of the body length of the first vehicle or the projection of the body width of the first vehicle on the plane perpendicular to the optical center direction, the width of the preset 2D bounding box, and a known value representing a preset actual length-to-width ratio of the first vehicle, wherein the observation angle of the first vehicle, the projection of the body length of the first vehicle or the projection of the body width of the first vehicle on the plane perpendicular to the optical center direction, the width of the preset 2D bounding box, and the known value representing the preset actual length-to-width ratio of the first vehicle meet a preset condition; and wherein the projection of the body width of the first vehicle on the plane perpendicular to the optical center direction, the width of the preset 2D bounding box, and the preset actual length-to-width ratio of the first vehicle meet $$\theta = \arctan\left(\frac{\omega - a'}{\mu a'}\right)$$

with the observation angle of the first vehicle, the projection of the body length of the first vehicle on the plane perpendicular to the optical center direction, the width of the preset 2D bounding box, and the preset actual length-to-width ratio of the first vehicle meet $$\theta = \arctan\left(\frac{b}{\mu(\omega - b)}\right)$$

with the observation angle of the first vehicle, wherein ω is the width of the preset 2D bounding box, μ is the preset actual length-to-width ratio of the first vehicle, a' is the projection of the body width of the first vehicle in a direction parallel to an image plane, b is the projection of the body length of the first vehicle in the direction parallel to the image plane, and θ is the observation angle.

6. The apparatus according to claim 5, wherein the determine the orientation angle of the first vehicle based on the body boundary line comprises:

determine, based on the body boundary line and the width of the preset 2D bounding box, the projection of the body length of the first vehicle in the direction parallel to the image plane;

determine, based on the body boundary line and the width of the preset 2D bounding box, the projection of the body width of the first vehicle in the direction parallel to the image plane; and determine the orientation angle of the first vehicle based on the projection of the body width of the first vehicle on the plane perpendicular to the optical center direction, the projection of the body length of the first vehicle on the plane perpendicular to the optical center direction, respective angles between two edges of the preset 2D bounding box and an optical center, and the preset actual length-to-width ratio of the first vehicle.

7. The apparatus according to claim 6, wherein the projection of the body width of the first vehicle on the plane perpendicular to the optical center direction, the projection of the body length of the first vehicle on the plane perpendicular to the optical center direction, the respective angles between the two edges of the preset 2D bounding box and the optical center, and the preset actual length-to-width ratio of the first vehicle meet $$\varphi = \arctan\left(\frac{\mu b1 - a\tan\beta}{a + \mu b1\tan\alpha}\right)$$

with the orientation angle of the first vehicle, wherein a is the projection of the body length of the first vehicle on the plane perpendicular to the optical center direction, b1 is the projection of the body width of the first vehicle on the plane perpendicular to the optical center direction, α is an angle between a left edge of the 2D bounding box and the optical center, β is an angle between a right edge of the 2D bounding box and the optical center, and φ is the orientation angle of the first vehicle, and μ is the preset actual length-to-width ratio of the first vehicle.

8. The apparatus according to claim 5, wherein the programming instructions, when executed by the at least one processor, cause the apparatus to:

determine, based on the orientation angle of the first vehicle and the body boundary line, 3D bounding box information corresponding to the first vehicle.

9. One or more non-transitory computer-readable media storing computer instructions, that when executed by one or more processors, cause a computing device to perform operations comprising:

obtaining a body boundary line of a first vehicle, wherein the body boundary line comprises a boundary line at a boundary between a body and a head of the first vehicle, or a boundary line at a boundary between the body and a tail of the first vehicle; and determining at least one of an observation angle of the first vehicle or an orientation angle of the first vehicle based on the body boundary line, wherein the determining the observation angle of the first vehicle based on the body boundary line comprises:

determining, based on the body boundary line and a width of a preset two dimensional (2D) bounding frame, a projection of a body length of the first vehicle or a projection of a body width of the first vehicle on a plane perpendicular to an optical center direction; and determining the observation angle of the first vehicle based on the projection of the body length of the first vehicle or the projection of the body width of the first vehicle on the plane perpendicular to the optical center direction, the width of the preset 2D bounding box, and a known value representing a preset actual length-to-width ratio of the first vehicle, wherein the observation angle of the first vehicle, the projection of the body length of the first vehicle or the projection of the body width of the first vehicle on the plane perpendicular to the optical center direction, the width of the preset 2D bounding box, and the known value representing the preset actual length-to-width ratio of the first vehicle meet a preset condition; and wherein the projection of the body width of the first vehicle on the plane perpendicular to the optical center direction, the width of the preset 2D bounding box, and the preset actual length-to-width ratio of the first vehicle meet $$\varphi = \arctan\left(\frac{\omega - a'}{\mu a'}\right)$$

with the observation angle of the first vehicle, the projection of the body length of the first vehicle on the plane perpendicular to the optical center direction, the width of the preset 2D bounding box, and the preset actual length-to-width ratio of the first vehicle meet $$\theta = \arctan\left(\frac{b}{\mu(\omega - b)}\right)$$

with the observation angle of the first vehicle, wherein ω is the width of the preset 2D bounding box, μ is the preset actual length-to-width ratio of the first vehicle, a' is the projection of the body width of the first vehicle in a direction parallel to an image plane, b is the projection of the body length of the first vehicle in the direction parallel to the image plane, and θ is the observation angle.

10. The one or more non-transitory computer-readable media according to claim 9, wherein the determining the orientation angle of the first vehicle based on the body boundary line comprises:

determining, based on the body boundary line and the width of the preset 2D bounding box, the projection of the body length of the first vehicle in the direction parallel to the image plane;

determining, based on the body boundary line and the width of the preset 2D bounding box, the projection of the body width of the first vehicle in the direction parallel to the image plane; and determining the orientation angle of the first vehicle based on the projection of the body width of the first vehicle on the plane perpendicular to the optical center direction, the projection of the body length of the first vehicle on the plane perpendicular to the optical center direction, respective angles between two edges of the preset 2D bounding box and an optical center, and the preset actual length-to-width ratio of the first vehicle.

11. The one or more non-transitory computer-readable media according to claim 10, wherein the projection of the body width of the first vehicle on the plane perpendicular to the optical center direction, the projection of the body length of the first vehicle on the plane perpendicular to the optical center direction, the respective angles between the two edges of the preset 2D bounding box and the optical center, and the preset actual length-to-width ratio of the first vehicle meet $$\varphi = \arctan\left(\frac{\mu b1 - a\tan\beta}{a + \mu b1\tan\alpha}\right)$$

with the orientation angle of the first vehicle, wherein a is the projection of the body length of the first vehicle on the plane perpendicular to the optical center direction, b1 is the projection of the body width of the first vehicle on the plane perpendicular to the optical center direction, α is an angle between a left edge of the 2D bounding box and the optical center, β is an angle between a right edge of the 2D bounding box and the optical center, and φ is the orientation angle of the first vehicle, and μ is the preset actual length-to-width ratio of the first vehicle.

12. The one or more non-transitory computer-readable media according to claim 9, wherein the operations comprise: determining, based on the orientation angle of the first vehicle and the body boundary line, 3D bounding box information corresponding to the first vehicle.

* * * * *